July 20, 1943.   C. S. JACKSON ET AL   2,324,506
SPOT MACHINE
Filed June 11, 1940   10 Sheets-Sheet 2

Fig. 2.

INVENTORS
CLARENCE S. JACKSON
ALEXANDER C. PARLINI
EUGENE HASCHER
BY D. Malcolm
ATTORNEY

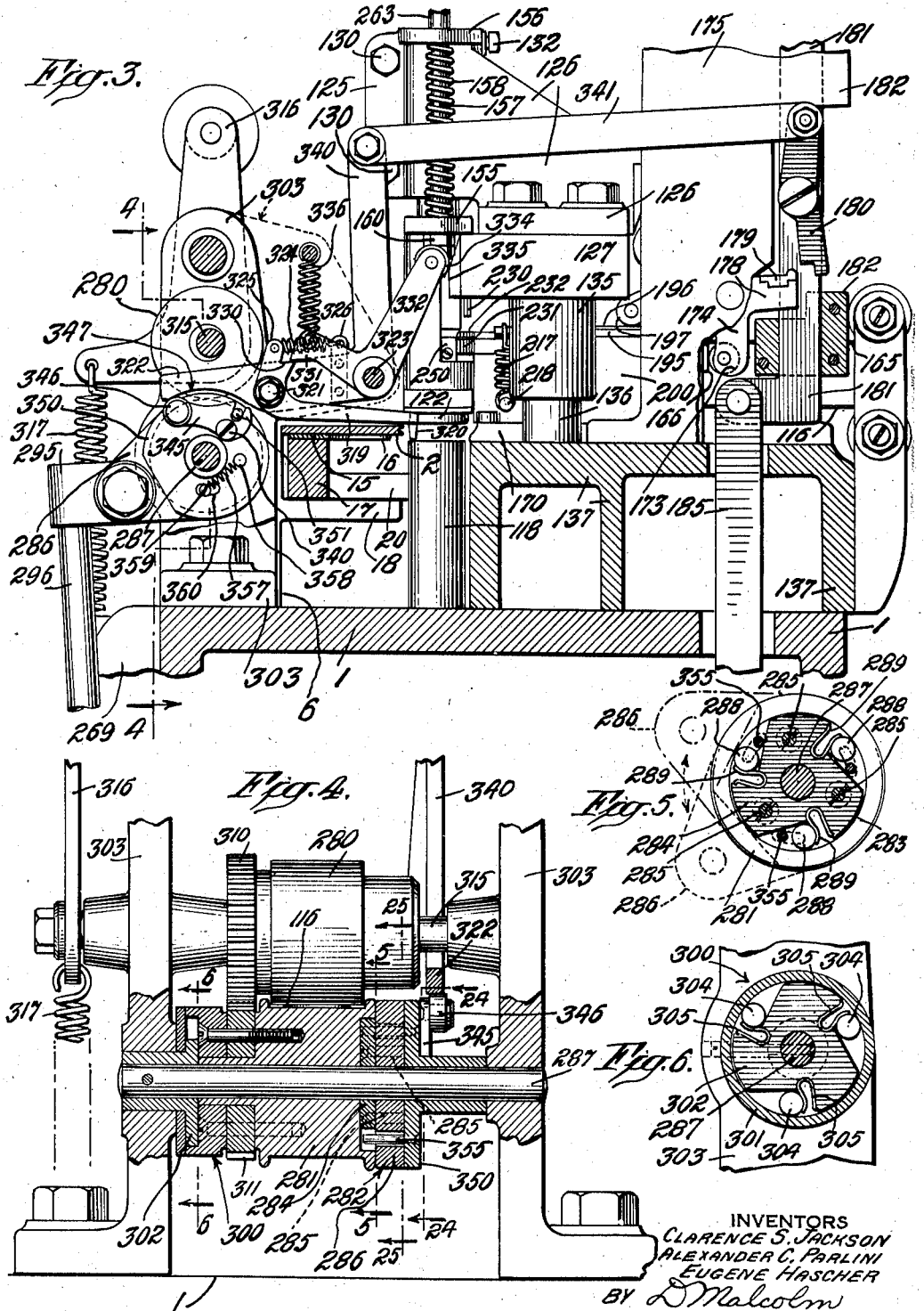

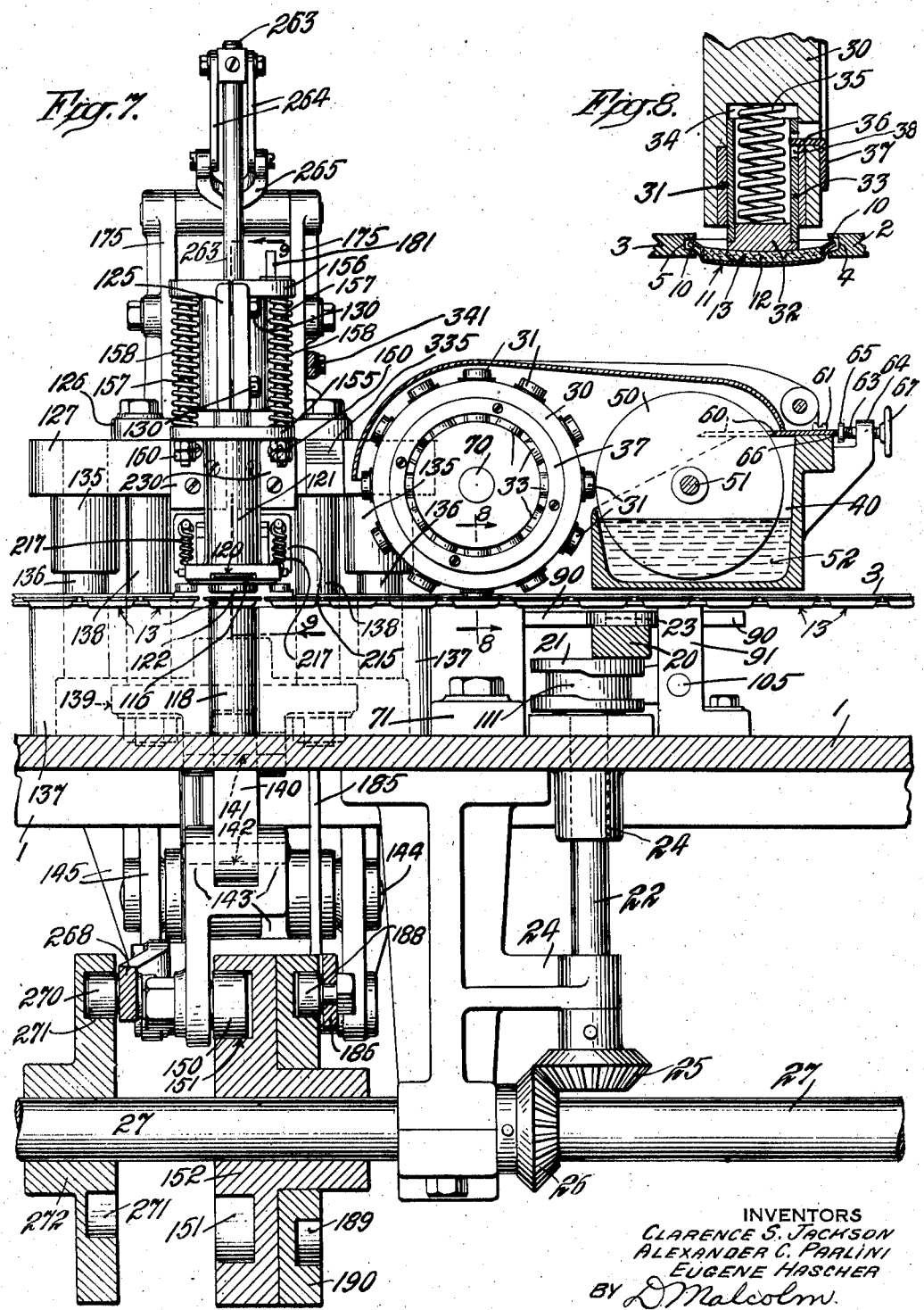

July 20, 1943.　　C. S. JACKSON ET AL　　2,324,506
SPOT MACHINE
Filed June 11, 1940　　10 Sheets-Sheet 5
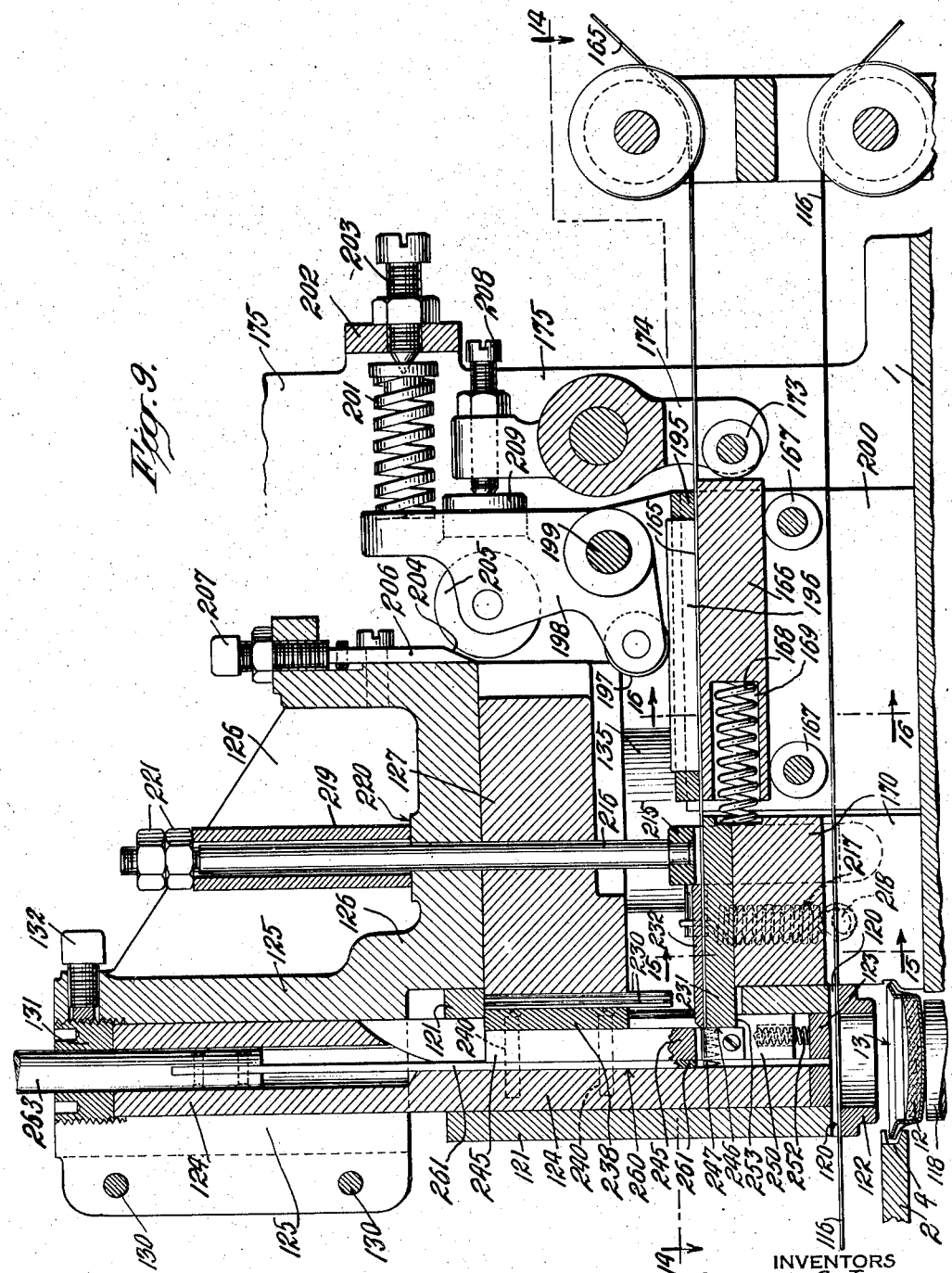
INVENTORS
CLARENCE S. JACKSON
ALEXANDER C. PARLINI
EUGENE HASCHER
BY D. Malcolm
ATTORNEY July 20, 1943.　　C. S. JACKSON ET AL　　2,324,506
SPOT MACHINE
Filed June 11, 1940　　10 Sheets-Sheet 6
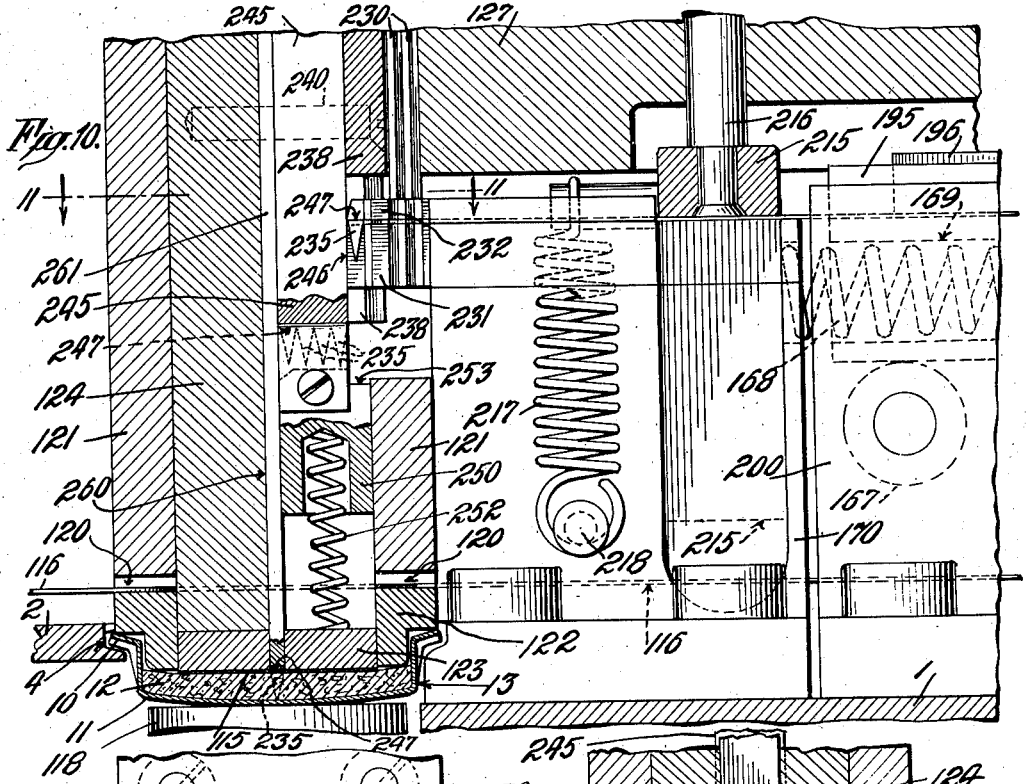
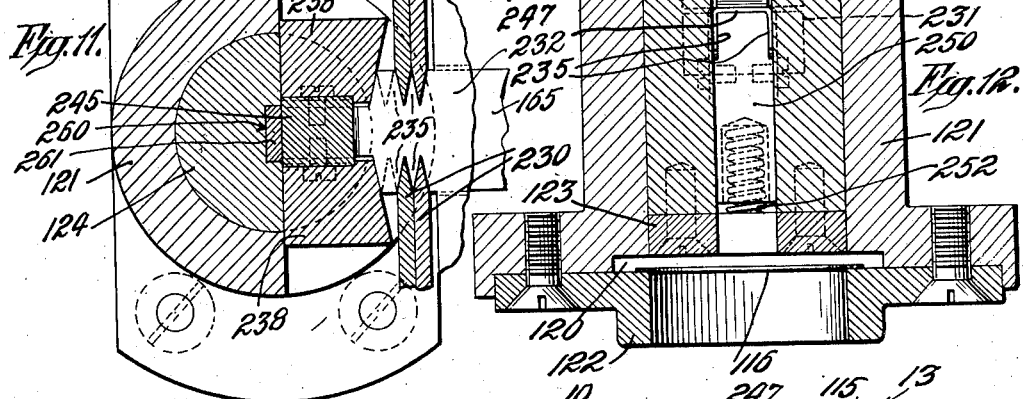
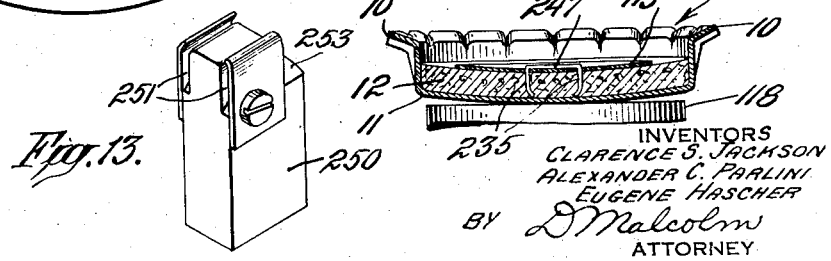
INVENTORS
CLARENCE S. JACKSON
ALEXANDER C. PARLINI
EUGENE HASCHER
BY D. Malcolm
ATTORNEY

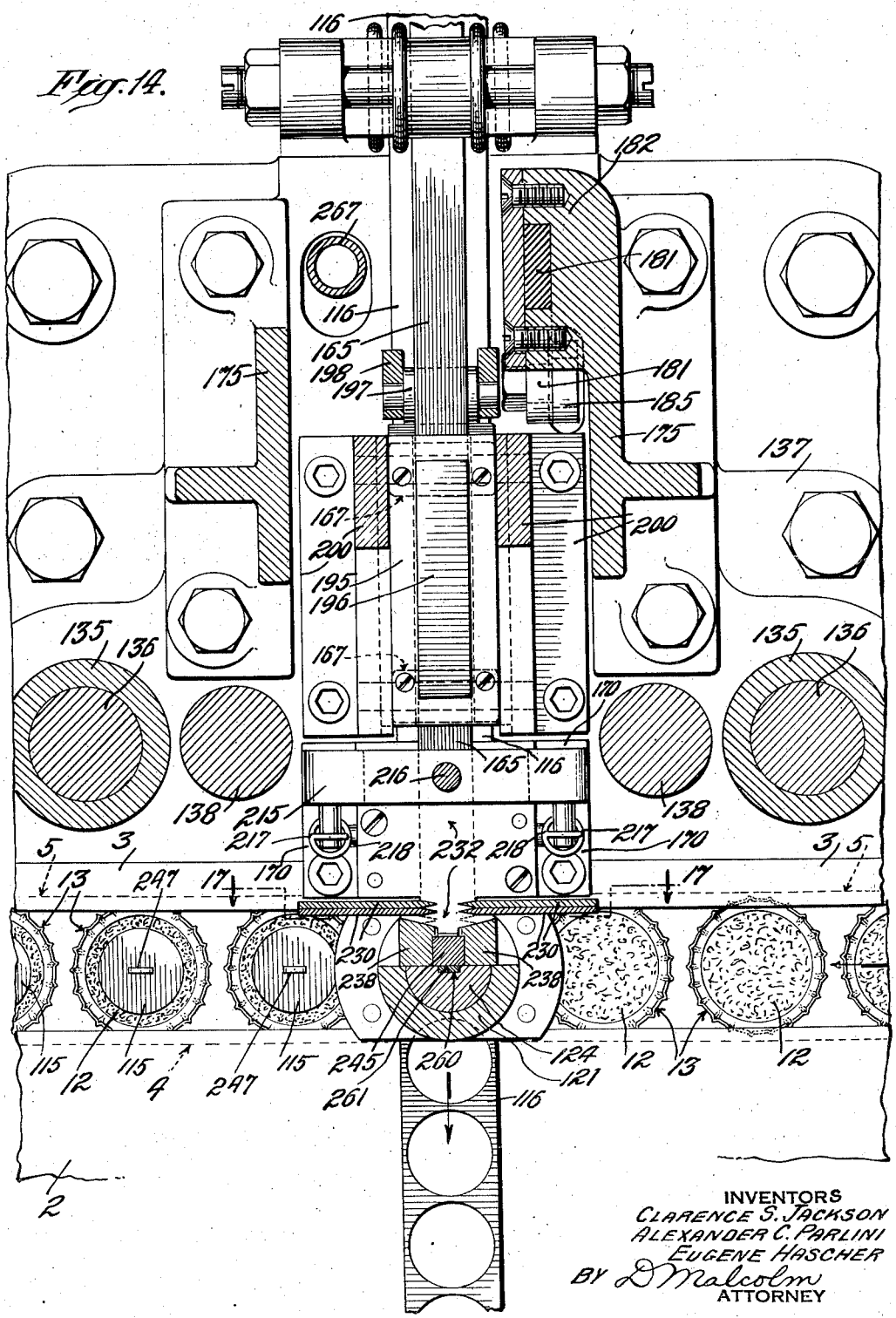

July 20, 1943.  C. S. JACKSON ET AL  2,324,506
SPOT MACHINE
Filed June 11, 1940  10 Sheets-Sheet 9
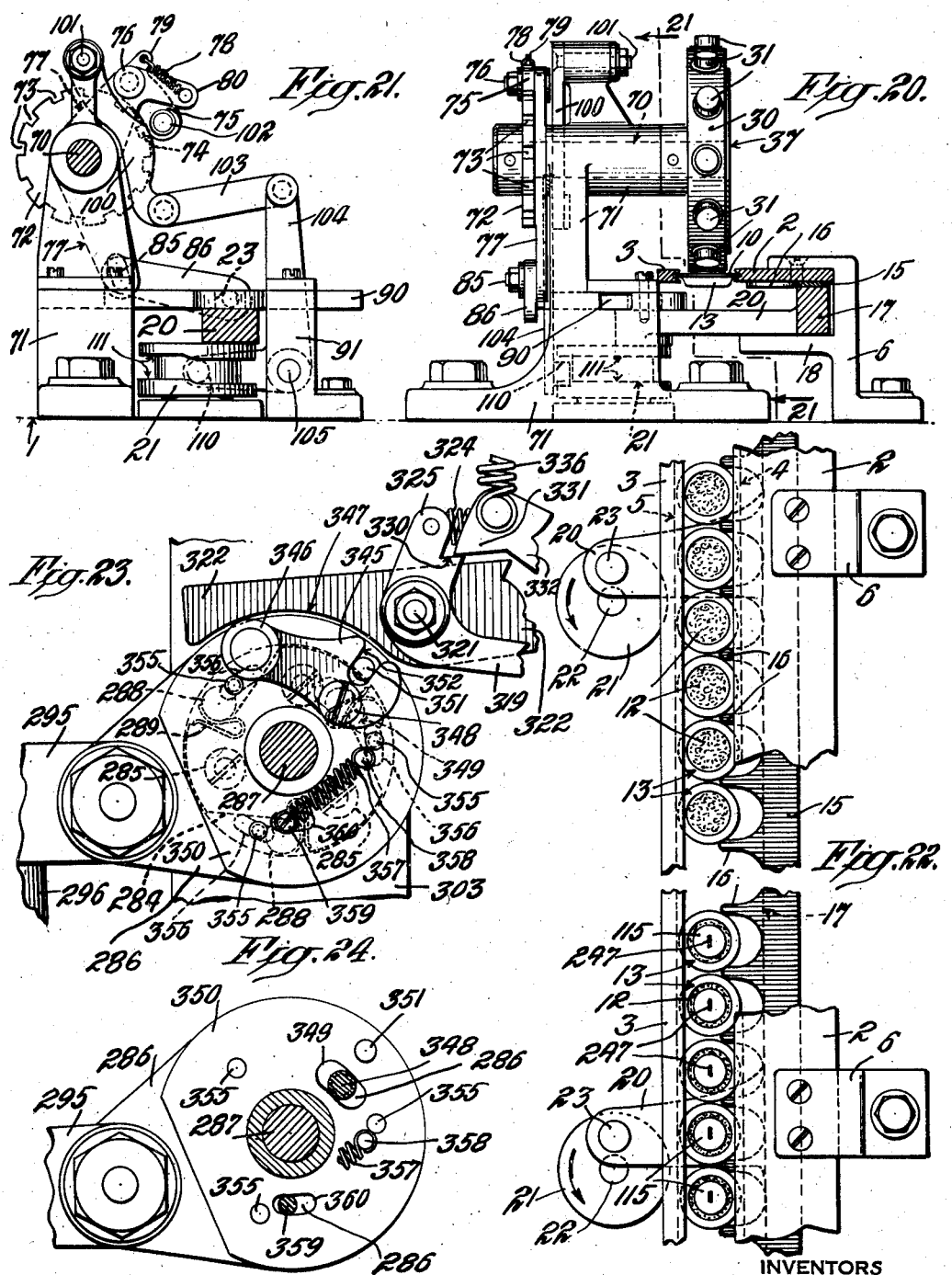
INVENTORS
CLARENCE S. JACKSON
ALEXANDER C. PARLINI
EUGENE HASCHER
BY D. Malcolm
ATTORNEY July 20, 1943.   C. S. JACKSON ET AL   2,324,506
SPOT MACHINE
Filed June 11, 1940   10 Sheets-Sheet 10
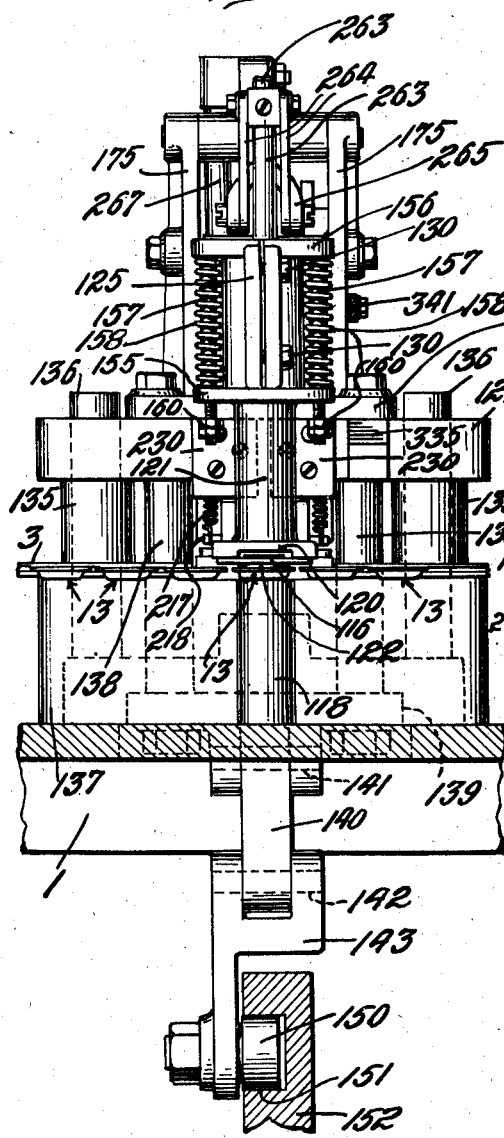
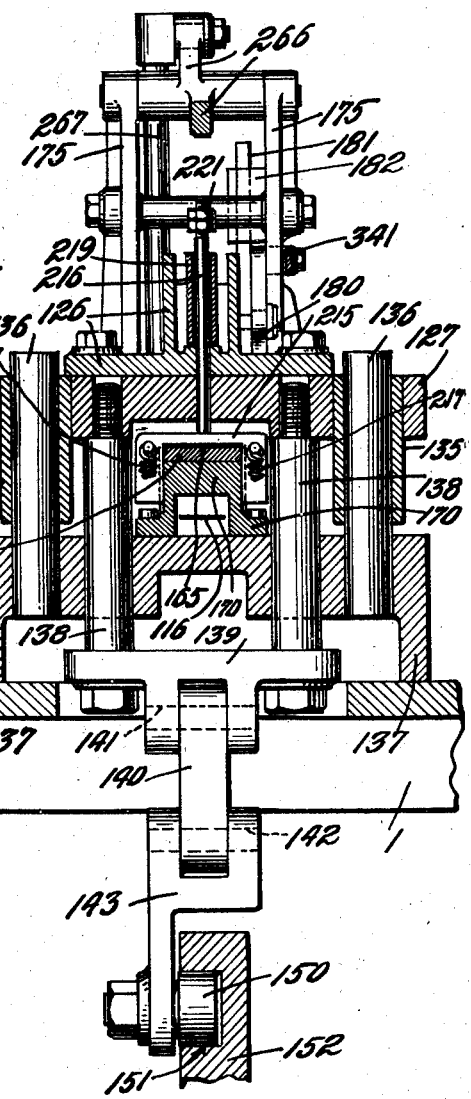
INVENTORS
CLARENCE S. JACKSON
ALEXANDER C. PARLINI
EUGENE HASCHER
BY D. Malcolm
ATTORNEY Patented July 20, 1943

2,324,506

UNITED STATES PATENT OFFICE 2,324,506

SPOT MACHINE

Clarence S. Jackson, Brooklyn, and Alexander C. Parlini, Freeport, N. Y., and Eugene Hascher, Newark, N. J., assignors to Peters Bros. Rubber Co., Inc., Brooklyn, N. Y., a corporation of New York Application June 11, 1940, Serial No. 339,898

28 Claims. (Cl. 113—80)

This invention relates to an apparatus for applying an interior facing or spot to closures of the type having a metal shell and a cushion liner of composition cork of the like, commonly called crown type closure caps.

The facing disk or spot is formed of impervious material such as aluminum foil, tin foil, varnished paper or the like and is used for the purpose of protecting the contents of the container from the deleterious effects of chemicals in the cork binder as well as to prevent liquid from penetrating cracks in the cork liner after capping and thus reaching the metal of the shell.

In commercial practice these spots have been fastened to the liners by means of thermoplastic gum or other adhesive material. The aluminum spot material for standard crown caps, for example, is made from strips or ribbons, the back of which has been coated with a thin thermoplastic film suited for the above purpose. The spot is applied by stamping the disk from this strip and then applying heat and pressure to cause the thermoplastic film to secure the spot on the cork liner.

This standard procedure involves the use of intricate machines known as spot machines which are costly to operate and construct and require constant attention in order to make the spots adhere to the cork lining with the necessary accuracy and permanence, particularly when operated at the high speeds required for commercial operations. In spite of the best care in operating procedure it is difficult to obtain uniformity of product. For example, in the morning when such a machine is first started up it is usually cold and the spots are not tightly stuck to the cork, whereas in the afternoon, after prolonged usage, the machines tend to become overheated and the adhesive material may be burned or overcooked and thus lose its adhesiveness. Furthermore the coated spots have a tendency to slide into an off-center position on the liner unless they are held in position until the adhesive has set.

Another disadvantage in using thermoplastically coated metal foil for the manufacture of spots is that scrap foil coated with adhesive material brings only about one-third the price of uncoated metal foil in the scrap metal market. Still another very serious objection to relying upon adhesives for securing the spots as described above is that the adhesive material tends to lose its adhesion with age, thereby causing the spots to drop off the finished caps and making it impracticable to store the caps for any prolonged period. This is a disadvantage to cap manufacturers who would prefer to apply the spots to the caps during their dull seasons and to store the finished caps until required by the bottling plants.

It is accordingly an object of the present invention to provide a novel and improved machine for rapidly and efficiently applying spots to crown type caps without relying upon adhesives for securing the spots in place. Another object is to provide a novel and improved apparatus for applying spots to caps of the above type, which eliminates the various disadvantages inherent in adhesively secured spots.

Another object of the invention is to provide a novel and improved apparatus for securing an uncoated spot to the liner of a crown cap. Still another object is to provide a novel and improved machine for securing spots in such a way that the finished caps may be stored for indefinite periods without danger of the spots becoming loose or dropping off. A further object is to provide a high speed machine of the above type having novel and improved details of construction and features of operation.

Various other objects and advantages will be apparent as the nature of the invention is more fully disclosed.

In one embodiment of the invention the machine is adapted to punch spots from a strip of spot material and to position the same on the cushion liner of a cap of the above type. The spots are secured by means of a staple which is cut from a strip of staple material and is applied while the spots are held down on the cushion liner by means of a spot plunger. The staples are bent and locked by contact with the metal shell of the cap so that the spots are positively and securely held in pressure engagement with the liner. A suitable filler may, if desired, be applied to the liner to seal the holes which may be made in the spot by the staples, so as to make a completely impervious closure.

In the form shown herein for purposes of illustration the machine is provided with an oscillating feed comb which feeds the caps step by step, in predetermined spaced relationship, to the operating stations. At the first or filler applying station the filler material is applied to the cushion liner in the position where the staple is to be inserted. At the second or spot applying station the spot is applied to the liner over the filler material and the securing staple is inserted.

The filler material is applied by a transfer wheel carrying a plurality of transfer plungers which are adapted to engage the liners of successive caps at the first station. The plungers wipe against the surface of a roller which rotates in a reservoir of liquid filler material and picks up a surface film thereof. The thickness of the film may be adjusted by a doctor blade or the like which cooperates with the roller.

The transfer wheel is preferably driven step by step, in synchronism with the feed of the caps, so that an individual plunger cooperates with each cap as it reaches the first station. The transfer wheel and the caps may, however, both feed continuously at the first station if desired although a step by step feed is essential at the spot applying station.

At the spot applying station a forming die punches the spot from a strip of spot material and applies the same to the cap liner. The die includes an outer annular member which engages the liner at its periphery for centering the cap and holding the same in position, and a plunger which cuts the spot and applies the same to the liner within the outer annular member.

The plunger is provided with an axial channel suited to guide a staple or the like to position for securing the spot. A stapling plunger reciprocates in said channel to feed and drive the staple through the spot and through the liner while the spot is still held down by the die plunger. There is accordingly no opportunity for the spot to slide or shift with respect to the liner or to wrinkle or dish as the staple is applied.

The staple is so proportioned that the points are bent over by contact with the metal shell, thereby locking the staple in place and holding the spot in pressure engagement with the liner.

Suitable feed means are provided for feeding the spot strip and the staples to the die and stapling plunger respectively. In the form shown the spot strip is fed between a pair of feed rolls which are given a step-by-step movement by a one-way ball clutch driven by a reciprocating rod. A second one-way ball clutch prevents reverse movement of the feed rolls during the return stroke of the reciprocating rod.

The staples may be formed from a strip of staple material. For this purpose a forming mechanism is associated with the die. The forming mechanism comprises a cutting die adapted to cut the staple points, a plunger adapted to bend the points downwardly and a second cutter to cut the individual staples from the strip. The cut staples are fed by the strip to the channel in the die plunger for application to the caps.

The staple strip may be fed step by step by a pair of reciprocating blocks engaging opposite sides thereof. The blocks are held in pressure engagement with the strip during the feed stroke and are released during the return stroke.

In order to stop the feed of the spot strip and staple strip in the absence of a cap in spot-applying position, a finger is positioned to be engaged and elevated by a cap in said position. The finger, when released due to absence of a cap, actuates a ball release mechanism to render the one-way ball drive clutch inoperative, and also releases a latch mechanism which interrupts the drive means for the reciprocating blocks. The feed of the spot and staple strips is thus stopped until a cap is fed into spot receiving position and again elevates the finger.

The die plunger and the staple forming mechanism are all mounted on a single reciprocating head which is driven in synchronism with the cap feed comb. The machine is particularly designed to operate at high speed as required in commercial use. The staples should be made of some material which is inert to the contents of the container and preferably are made of the same material as the spot itself, for example aluminum, so that only a single inert metal is exposed. If the spot is made of varnished paper or other non-metallic material the staples may be formed of aluminum or other inert metal.

An important feature of our machine resides in the use of means to hold the spot in position while the staple is being applied so that the spots are accurately centered and wrinkling or dishing are prevented. Another feature resides in the use of a filler to close any slight opening in the spot which may be made by the staple. The filler may also exert some adhesive effect for holding the spot onto the liner although the principal holding power is provided by the staple and the spot cannot become loosened or drop off should the filler lose its adhesiveness.

Although the novel features which are believed to be characteristic of the invention are pointed out more particularly in the claims appended hereto, the invention itself may be better understood by referring to the following description, taken in connection with the accompanying drawings in which a specific embodiment thereof has been set forth for purposes of illustration.

In the drawings,

Fig. 2 is a transverse section taken on the line 2—2 of Fig. 1;

Fig. 3 is an enlarged detail view similar to Fig. 2 showing the strip feed mechanism in inoperative position;

Fig. 4 is a section taken on the line 4—4 of Fig. 3 showing the drive for the strip spot material;

Figure 1:
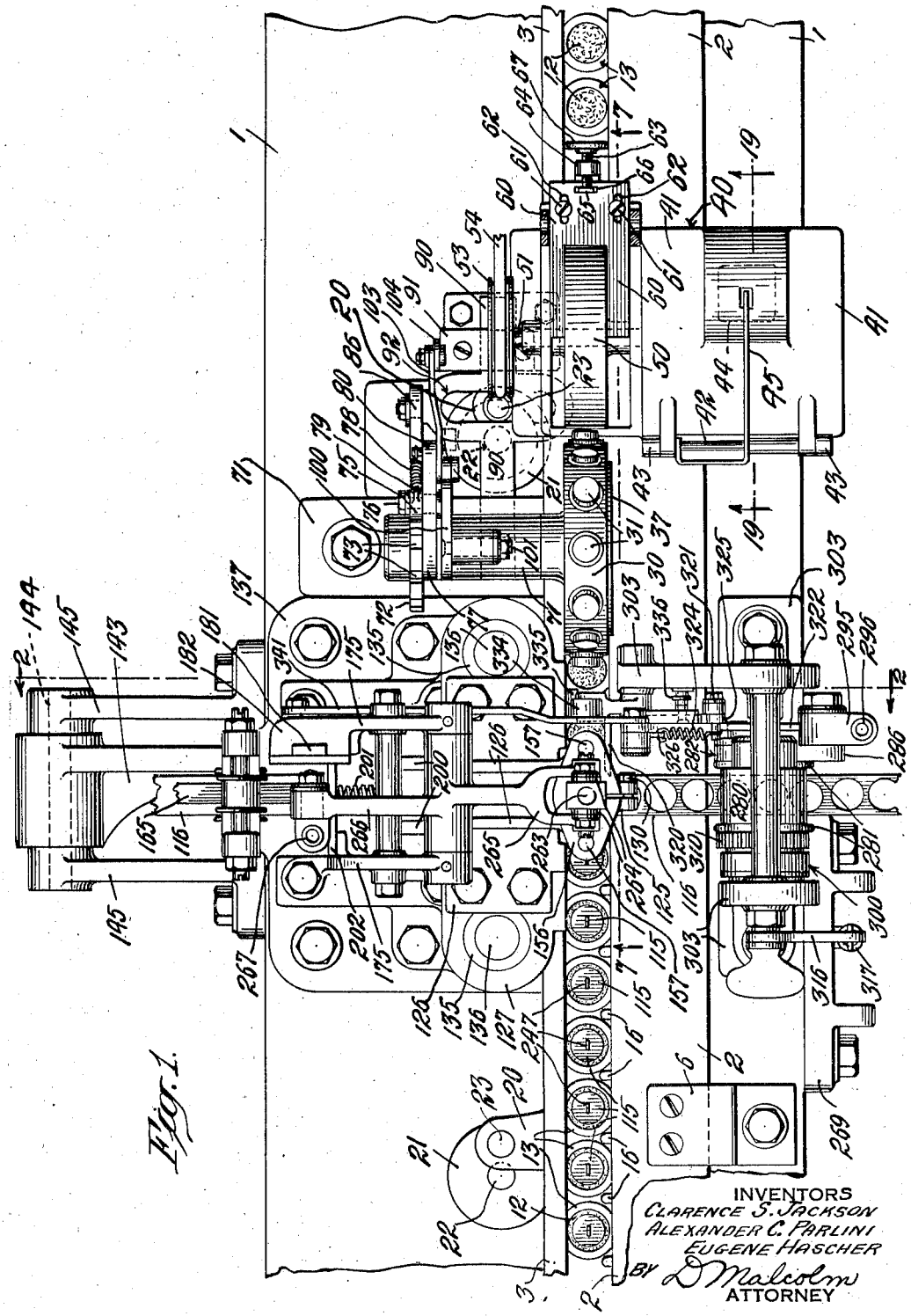
Fig. 1 is a top plan view of a machine embodying the present invention.

Figs. 5 and 6 are detail sections taken on the lines 5—5 and 6—6, respectively, of Fig. 4;

Fig. 7 is a longitudinal section through the machine taken on the line 7—7 of Fig. 1;

Fig. 8 is a detail section taken on the line 8—8 of Fig. 7 showing the construction of one of the transfer plungers;

Fig. 9 is a section taken on the line 9—9 of Fig. 7 showing the feed mechanism for the staple strip;

Fig. 10 is an enlarged detail view of the operating head;

Fig. 11 is a transverse section taken on the line 11—11 of Fig. 10;

Fig. 12 is a detail view of the die plunger showing the position thereof after the spot has been applied to a cap;

Fig. 13 is a perspective view of the staple guide;

Fig. 14 is a horizontal section taken on the line 14—14 of Fig. 9;

Fig. 15 is a section taken on the line 15—15 of Fig. 9 showing the staple strip clamp;

Fig. 16 is a section taken on the line 16—16 of Fig. 9 showing the staple feed block;

Fig. 17 is a section taken on the line 17—17 of Fig. 14 showing the details of construction of the stapling plunger;

Fig. 18 is a transverse section taken on the line 18—18 of Fig. 17;

Fig. 19 is a section taken on the line 19—19 of Fig. 1 showing the filler reservoir;

Fig. 20 is a detail view showing the transfer wheel;

Fig. 21 is a section taken on the line 21—21 of Fig. 20;

Fig. 22 is a detail plan view of the cap feed comb;

Fig. 23 is an enlarged detail view of the spot strip feed mechanism;

Figs. 24 and 25 are sections taken on the line 24—24 and 25—25 respectively, of Fig. 4;

Fig. 26 is a detail view of the operating head and associated mechanism; and

Fig. 27 is a section taken on the line 27—27 of Fig. 2.

In the following description and in the claims certain specific terms are used for convenience in referring to the various details of the invention. These terms, however, are to be given as broad an interpretation as the state of the art will permit.

*Cap feed mechanism*

Referring to the drawings more in detail, the spot machine is shown as comprising a base or frame 1 carrying a pair of guide rails 2 and 3 (Figs. 1, 8, 10, 14, 20 and 22) provided with channels 4 and 5, respectively, in which the flanges 10 of the shells 11 of the crown caps 13 are adapted to seat. The guide rail 2 may be supported by suitable brackets 6 carried upon the base 1. The guide rail 3 may be supported by similar brackets, not shown. Suitable means such as a hopper, not shown, may be provided for feeding the caps to the guide rails 2 and 3 at the right of Fig. 1 in a position such that they are progressively passed through the machine.

The caps 13 comprise a shell 11 having a cushion liner 12 secured therein in any well known manner as by a suitable thermoplastic adhesive. The caps 13 are fed along the guide rails 2 and 3 with the cushion liner uppermost.

For feeding the caps a feed comb 15 is provided having fingers 16 adapted to extend between the adjacent caps so as to separate and feed the same in a predetermined spaced relationship. The comb 15 is mounted on a crossbar 17 (Fig. 20) which is adapted to slide on arms 18 carried by the brackets 6. The crossbar 17 is actuated by a pair of arms 20 journaled to pins 23 (Figs. 20, 21 and 22) fastened eccentrically on cam wheels 21 which are mounted upon and driven by shafts 22 (Fig. 7). The shafts 22 are mounted in brackets 24 carried by the frame 1 and are each provided with a mitre gear 25 meshing with a corresponding beveled gear 26 carried on and driven by a main driveshaft 27 which extends across the machine and may be driven by any suitable means not shown. The operation of the cam wheels 21 causes the comb 15 to feed the caps through the machine with a progressive step-by-step movement.

*Transfer mechanism*

As the caps advance through the machine a film of a suitable gummy liquid filler is applied to the cushion liners 12 by the transfer mechanism shown in Figs. 1, 2, 7, 19, 20 and 21 as comprising a transfer wheel 30 carrying a set of spring-pressed transfer plungers 31.

These plungers 31, as shown in detail in Fig. 8, each comprise a head 32 secured to a sleeve 33 which is journaled in suitable bores 34 in the periphery of the transfer wheel 30. The plungers 31 are normally forced outwardly by springs 35 and are held in position by stops 36 carried on a ring 37 attached to the wheel 30 and engaging apertures 38 formed in the sleeves 33.

The filler is held in a reservoir 40 which is suitably attached to the frame 1 and is provided with a cover 41 which may be hinged thereto by a hinge pin 42 carried on suitable brackets 43 as shown in Fig. 1. An alarm or signal may be provided for indicating when the liquid level in reservoir 40 falls below a predetermined point. This is illustrated in Fig. 19 as comprising a float 44, mounted on an arm 45 which is pivoted to hinge pin 42. The arm 45 may carry a contact 46 which is adapted to bridge a pair of stationary contacts 47 for closing an electric circuit when the float 44 falls to a predetermined level in the reservoir 40. The stationary contacts 47 may be mounted on a bracket 48 by any suitable means.

A roller 50 is mounted on a shaft 51 in position to dip in the gummy filler 52 in the reservoir 40 (Figs. 7 and 19). This roller is driven by suitable means such as a pulley 53 attached to the shaft 51 and driven by a belt 54 (Fig. 1) which is actuated by any suitable means not shown.

The thickness of the film of filler material on the periphery of the roller 50 is controlled by a doctor blade 60 which is mounted on the reservoir by screws 61 extending through elongated apertures 62 in said blade (Figs. 1 and 7). The position of the blade with respect to the roller 50 is controlled by an adjusting screw 63 mounted in a bracket 64 and carrying at its end a head 65 which engages in a slot 66 in said blade. An adjusting wheel 67 is provided for manually controlling said adjusting screw. In operation the position of the doctor blade is adjusted by manipulating the wheel 67 in accordance with the thickness of film which is to be transferred to the heads 32 of the plungers 31.

The transfer wheel 30 is so positioned that the heads 32 of the plungers 31 contact the surface of the roller 50 and pick up a coating of liquid filler material which they transfer to the cushion liners 12 in the caps as the caps advance past the transfer station. For this purpose the wheel 30 is mounted for rotation on a shaft 70 which is journaled in a bracket 71 attached to the frame 1 (Figs. 1, 20 and 21). The shaft 70 carries a star wheel 72 having a plurality of notches 73 adapted to be engaged by a dog 74 carried on an arm 75 which is journaled by pin 76 on arm 77. The dog 74 is held in position in a notch 73 of the star wheel 72 by means of a spring 78 which is attached to an ear 79 on the arm 75 and is anchored to a projection 80 on the arm 77 (Figs. 1, 20 and 21).

The arm 77 is journaled about the shaft 70 and is pivotally connected by pin 85 to a link 86. The link 86 is pivoted to the crosshead 90 which is slidably mounted for movement in the brackets 71 and 91. The crosshead 90 is provided with a slot 92 in which one of the eccentric pins 23 travels. The latter pin 23 extends beyond the corresponding arm 20 to enter the slot 92 in the crosshead 90 for driving the crosshead and the link 86 attached thereto.

In the mechanism above described the dog 74 is oscillated for driving the star wheel 72. In order to lift the dog out of engagement with the notches 73 in the star wheel, a link 100 is provided (Fig. 21) which is pivoted at 101 to the bracket 71 and engages a roller 102 carried by the arm 75. The link 100 is attached by the link 103 to a bell crank lever 104 which is pivoted at 105 to the bracket 91. The bell crank lever 104 carries a pin 110 engaging a cam slot 111 formed in the cam wheel 21. The slot 111 is adapted to actuate the link 100 so as to lift the dog 74 out of engagement with the notches 73 of the star wheel 72 during the return stroke but to release the dog and to allow the same to enter a notch 73 during the feed stroke, whereby the star wheel is fed with a step-by-step motion.

The star wheel 72 is designed to rotate the transfer wheel 30 in synchronism with the cap feed mechanism so that successive plungers engage successive caps and apply the desired film of filler material thereto as the caps are fed past the transfer station.

It will be noted that the filler material is applied only to the center part of the cushion liners 12 of the caps, in a position to close any slight openings which may be made by the passage of the staples through the spot.

Spot forming die

In accordance with our invention the disc spots 115 are punched out of a strip 116 of aluminum foil or the like (Fig. 9) which is fed through the machine from a suitable reel, not shown. In the spot-applying position the cap 13 rests on an anvil 118 with the cushion liner 12 uppermost for receiving the spot. The strip 116 passes through an aperture 120 in a die comprising a sleeve 121 having attached thereto an outer die piece 122 (Figs. 9 and 12).

A plunger 124 having a cutting head 123 is mounted to reciprocate within the sleeve 121 and, in its working stroke, punches out the center spot 115 from the strip 116 and positions the same in the cap. The plunger 124 is secured in a split clamp 125 (Figs. 1 and 9) formed on a bracket 126 which is attached to a head 127 (Figs. 2, 3, 7, 9, 10, 26 and 27). The plunger 124 is frictionally held in the split clamp 125 by bolts 130 (Figs. 1 and 9) and is secured in position by a lock nut 131 threaded into the clamp 125 and held by a set screw 132.

The drive for the head 127 is shown in Figs. 2, 7, 26 and 27. Referring to these figures, the head 127 is shown as provided with sleeve 135 slidable on guide rods 136 which are secured in a bracket 137 attached to the base 1. The head 127 carries pins 138 which are secured in a yoke 139, to which a link 140 is pivotally connected by a pin 141. The link 140 is pivoted, by a pin 142, to an arm 143 which is pivoted by a pin 144 to a stationary bracket 145 attached to the frame 1 (Fig. 2). The arm 143 carries a roller 150 which rides in a cam slot 151 in a cam wheel 152 which is fixed to the shaft 27.

The sleeve 121 carries crosshead 155 (Figs. 7 and 26). A similar crosshead 156 is carried by the clamp 125. The crosshead 156 carries threaded pins 157 which extend through suitable apertures in the lower crosshead 155. Springs 158 are carried on the pins 157 between the crossheads 155 and 156 to hold the sleeve 121 downwardly. Locknuts 160, carried on the lower ends of the pins 157, serve as stops and also as supporting means for elevating the sleeve 121 with the head 127 during the upward movement of the head.

The arrangement is such that during the downward working stroke of the head 127 the outer die piece 122 is first brought into engagement with the cushion liner 12 of the cap 13. Thereafter further downward movement of the head 127 causes the plunger 124 to slide in the sleeve 121 and to punch out the spot 115 and to position the same within the outer die piece 122 on said cushion liner.

Staple strip feed mechanism

The spot is secured in the cushion liner by a staple 247 which is formed from a staple strip 165 supplied from a suitable reel, not shown. The staple strip feed is shown in Figs. 2, 3, 9, 14, 15 and 16 as comprising a block 166 which is mounted for reciprocating movement on rollers 167 and is normally held in retracted position by means of a spring 168 seated in a bore 169 in said block and bearing against a stationary bracket 170.

A roller 173 is carried on an arm 174 pivoted to a stationary bracket 175. The arm 174 carries a projection 178 (Figs. 2 and 3) having a surface 179 adapted to be engaged by a latch 180 which is pivoted on a slide rod 181. The rod 181 is adapted to slide in stationary brackets 182. The latch 180 is normally in engagement with the surface 179 as shown in Fig. 2 and is adapted to rock the arm 174 in response to reciprocating movement of the rod 181.

The rod 181 is actuated by a link 185 which is pivoted to an arm 186 (Figs. 2 and 7). The arm 186 is pivoted by a pin 187 to the bracket 145 and carries at its free end a roller 188 (Fig. 7) which rides in a cam slot 189 in a cam wheel 190 which is attached to the cam wheel 152 and is driven therewith by shaft 27.

The block 166 carries a frame 195 (Figs. 9 and 14) in which a block 196 is loosely seated in a position to rest on the strip 165. The block 196 is held against the strip 165 by means of a roller 197 carried on an arm 198 which is pivoted by a pin 199 to stationary brackets 200. The brackets 200 in addition to supporting the arm 198 serve as guide means for the block 166 and the frame 195.

The roller 197 is normally held in pressure engagement with the block 196 by means of a spring 201 (Fig. 9) which is seated between the arm 198 and an adjusting screw 203 held in a crossbar 202. The arm 198 is provided with a roller 205 which is adapted to engage a cam surface 204 formed on a cam strip 206 carried by the bracket 126, to cause pivotal movement of the arm 198 for retracting the roller 197 for pressure engagement with the block 196. The cam strip 206 may be adjusted by means of an adjusting screw 207 to control the timing of the arm 198 (Fig. 9). The throw of the arm 174 may be adjusted by an adjusting screw 208 which is secured in said arm and bears against a stop 209 carried on the stationary bracket 175 as shown in Fig. 9.

The arrangement of the above-described mechanism is such that on the feed stroke of block 166 the block 196 is held in engagement therewith to clamp the staple strip 165 and to cause the same to be fed forwardly. On the return stroke of the block 166 the roller 197 is brought out of engagement with block 196 thereby releasing pressure on the strip 165 and permitting the blocks 166 and 196 to be retracted without causing reverse movement of the strip.

During the return stroke of the blocks 166 and 196 the strip 165 is clamped by means of a yoke 215 (Figs. 9, 14 and 15) carried by a rod 216 and normally held in clamping position by springs 217 which are anchored to pins 218 carried by the bracket 170. The rod 216 extends upwardly through the head 127 and the bracket 126 and through a loose sleeve 219 which rests upon a boss 220 formed on the bracket 126. The rod 216 is secured by locknut 221 which limits the downward movement thereof, the arrangement being such that upward movement of the head 127 lifts the yoke 215 from engagement with the strip 165 to permit feed movement of said strip. Downward movement of the head 127, however, permits the yoke 215 to clamp said strip against reverse movement while the blocks 166 and 196 are being retracted by the spring 168.

Staple forming and applying mechanism

The points of the staples are formed by an upper punch 230 (Figs. 9, 10, 11 and 14) which is attached to the head 127 and cooperates with a lower die 231 attached to the frame 170. A stripper 232 is attached to the lower die 231 and to the frame 170.

The punch 230 and die 231 cuts points 235 on the edges of the strip 165. These points 235 are then bent downwardly by a plunger 238 (Figs. 9, 10, 11, 14 and 17) which is attached by screws 240 to the plunger 124.

The staples, after the points have been bent downwardly by the plunger 238, are cut apart by an upper cutting die 245 which is also clamped between the plunger 238 and the plunger 124 (Fig. 18) and cooperates with the forward edge 246 of the lower cutting die 231 for severing individual staples 247. The staples 247, after being severed from strip 165, are carried in a staple guide block 250 having channels 251 (Fig. 12) adapted to receive the down-turned points 235 of the staples. The block 250 rides loosely in plunger 124 and is held upwardly by spring 252 (Fig. 10) which is seated upon the cutting head 123 of the plunger 124. The block 250 is provided with a shoulder 253 (Fig. 10) which contacts the under surface of the lower cutting die 231 for limiting the movement of said block.

The plunger 124 is provided with a guide channel 260 (Figs. 9–11) through which the staples 247 are fed for insertion in the disc spots. A stapling plunger 261 is adapted to reciprocate in the channel 260 for driving the staples.

The plunger 261 is carried by the rod 263 (Figs. 1, 2, 7 and 9) to the upper end of which a pair of links 264 are pivotally connected. The links 264 are connected to a yoke 265 formed on an arm 266 which is pivoted to the bracket 175 (Figs. 2 and 7). The arm 266 is actuated by rod 267 which is pivoted to an arm 268 as best shown in Fig. 2. The arm 268 is pivoted to a bracket 269 attached to the frame 1 and carries a roller 270 which rides in a cam slot 271 formed in a cam disk 272 attached to the shaft 27 (Fig. 7). The stapling plunger 261 is in raised position, as shown in Fig. 9, during the feeding of the staples. When the spot 115 has been positioned on the cushion liner 12 of the cap 13 by the downward movement of the head 127 and the associated guide members, as shown in Fig. 10, the staple is driven through the spot 115 into the cushion liner 12 by downward movement of the plunger 261. While the staple is thus being driven the cap 13 rests upon the anvil 118 which backs up the shell 11 and causes the points 235 of the staples to be bent over for locking the staple in position as shown in Fig. 12.

Spot strip feed mechanism

The spot strip 116 is fed to the machine between feed rollers 280 and 281 (Figs. 1 to 6, 23, 24 and 25). The feed roller 281 is driven by a one-way ball clutch 282 comprising a ball race 283 formed in the roller 281 and a cam wheel 284 which is attached by screws 285 to a cover plate 286. The plate 286 is journaled on a shaft 287 which loosely carries the roller 281. A plurality of balls or rollers 288 are seated within the ball race 283 for engagement with the cam wheel 284 (Fig. 5) and are held by springs 289 in locking position so that when the cam wheel is rotated in one direction the roller 281 is locked thereto and rotates therewith. The roller 281 is automatically released when the cam wheel 284 is rotated in the other direction by the balls 288 riding up on the cam surface of the cam wheel against the tension of springs 289.

The plate 286 is attached to a clip 295 carried by a rod 296 (Fig. 23) which is adjustably pivoted by means of a pin 297 (Fig. 2) to the arm 186, the arrangement being such that step-by-step feeding movement of the roller 281 is effected by operation of the arm 186.

For preventing reverse rotation of the roller 281 during the return stroke of the plate 286 a second one-way ball clutch 300 is provided which is formed by a ball race 301 (Fig. 6) attached to the roller 281 and cooperating with a cam wheel 302 which is pinned to the shaft 287 and to a bracket 303 attached to the frame 1 of the machine. A plurality of balls or rollers 304 are mounted in the ball race 301 and are normally held in locking position by springs 305, the arrangement being such that the balls 304 lock the roller 281 against reverse rotation during the return strokes of the plate 286.

The rollers 280 and 281 are caused to operate in unison by cooperating spur gears 310 and 311 respectively, which are attached thereto as shown in Fig. 4.

The roller 280 is mounted for rotation on a shaft 315 which is mounted in suitable eccentrics in brackets 303 (Fig. 4). A lever 316 is attached to the shaft 315 and is normally held in operative position by a spring 317 (Figs. 1–4). When the lever 316 is raised against tension of the spring 317 the shaft 315 is raised slightly due to the eccentric mounting thereof, thereby providing clearance between the rollers 280 and 281 to permit the strip 116 to be threaded therebetween.

Feed release mechanism

In order to prevent feed of the spot strip 116 and of the staple strip 165 when no cap is in position to receive the spot, a feed release mechanism is provided which comprises a finger 320 (Figs. 2 and 3) formed on an arm 319 which is pivoted by a pin 321 to an arm 322. The arm 322 is pivoted by a pin 323 to the bracket 303. The finger 320 is normally held downwardly by a spring 324 which is anchored between an ear 325 formed on the arm 319 and an ear 326 on the arm 322.

The arm 319 is also provided with a shoulder 330 which is adapted to be engaged by a pawl 331 formed on a lever 332 which is journaled on the pin 323. The lever 332 carries a roller 334 which bears against a cam surface 335 on the head 127. The roller 334 is normally held against said cam surface by a spring 336.

When a cap is at the stage preceding the anvil 115, at which anvil it is to receive the spot, the finger 320 strikes the shell 11 and is held thereby in a raised position as shown in Fig. 2, thereby bringing the shoulder 330 out of alignment with the pawl 331. In this position the pawl rocks freely in response to the vertical reciprocating movement of head 127 without affecting the feeding movement of the spot strip and the staple strip.

When a cap is not in position to receive a spot, however, the finger 320 drops down into the position shown in Fig. 3, whereupon the shoulder 330 is engaged by the pawl 331, thereby locking the lever 332 to the arm 322 as shown in Figs. 3 and 23, so that rocking movement of the lever 332 when the head 127 is elevated causes the arm 322 to be depressed.

For interrupting the feeding movement of the roller 281 an arm 345 is provided (Fig. 23) having a roller 346 which is adapted to engage an arcuate surface 347 formed on the arm 322. The arm 345 is pivoted by a pin 348 which is carried by the plate 286 and extends through an elongated slot 349 in a plate 350 (Fig. 24) which is journaled on the shaft 287. The plate 350 is provided with a pin 351 which is engaged by a slot 352 in the arm 345 for causing a slight rotational movement of the plate 350 when the arm 345 is actuated by engagement of the arm 322 with the roller 346.

The plate 350 carries pins 355 which extend through slots 356 in the cover plate 286 in a position to contact the balls 288. The plate 350 is normally held in a position such that the pins 355 are out of engagement with the balls 288 as shown in Fig. 5. For this purpose a spring 357 is provided (Fig. 24) which is anchored between pin 358 carried by the plate 350 and a pin 359 carried by the plate 286 which extends through a slot 360 in the plate 350.

When the arm 345 is depressed the plate 350 is shifted to a position such that pins 355 engage the balls 288 and retract the same against the tension of the springs 289 so as to release the clutch mechanism, whereupon the cover plate 286 is free to oscillate without causing corresponding movement of the cam wheel 284 and of the roller 281. Thus the feed of the spot strip material is stopped.

The arm 322 is attached to an arm 340 which is secured by a link 341 to the latch 180 in such a manner that when the arm 322 is depressed the latch 180 is brought out of engagement with the surface 179 and permits the rod 181 to reciprocate without causing feeding movement of the arm 174 and the block 166 which is actuated thereby, thus stopping the feed of the staple strip.

*Operation*

In the operation of the above-described machine the caps 13, with the cushion liners 12 secured therein, are fed to the guides 2 and 3 at the right of Fig. 1 by suitable means such as a hopper, not shown.

The caps are then advanced through the machine step by step by means of the feed comb 15 which is given a feeding movement by the eccentric pins 23. The fingers 16 of the comb 15 enter between the shells of adjacent caps for properly spacing and feeding the same through the machine.

As the caps advance through the machine a film of filler material is applied thereto by transfer plungers 31. These transfer plungers are mounted on the wheel 30 and are rotated by the ratchet movement comprising the feed dog 74 and associated mechanism shown in Figs. 20 and 21. The feed dog 74 is oscillated by means of the link 86 which is attached to the crosshead 90 and actuated by the eccentric pin 23. The dog 74 is retracted from the star wheel 72 by means of the arm 100 which is actuated by the bell crank lever 104 driven by the pin 110 engaging cam slot 111 in the cam wheel 21. The arrangement is such that the dog 74 is in driving relationship with the star wheel during its feeding stroke but is retracted during its return stroke.

The transfer wheel 30 is driven step by step in synchronism with the feed movement of the caps so that the successive transfer plungers 31 engage successive caps as they advance past the transfer station. The plungers 31 contact the surface of the roller 50 which is rotated in the reservoir 40 and carries a surface film of filler material. This filler may comprise any suitable gummy or other self-sealing material which is adapted to seal any holes which may be formed in the spot 115 by the staples and may have some adhesive properties if desired. By the means described above a film of filler is applied to the cushion liners 12 in the position which is to receive the spot of aluminum foil.

The strip of aluminum foil or the like 116 is fed through the machine by the feed rollers 280 and 281 which are advanced step by step by the one-way ball clutch mechanism driven by the reciprocating rod 296. The rod 296 is driven through the arm 186 by the cam wheel 190. The staple strip 165 is fed to the machine at the same time by means of the blocks 166 and 196 which are given an oscillating movement by the arm 174. The arm 174 is actuated by the latch 180 from the link 185 which is driven by the arm 186 actuated by the cam wheel 152.

When the caps are brought to the spot receiving station the outer die piece 122 first moves downwardly into engagement with the cushion liner 12 of the cap. The plunger 124 then punches out the disc spot from the strip 116 and positions the same on the cushion liner. While the spot is thus held down and under pressure by the plunger 124 a staple 247 is fed downwardly by the stapling plunger 261 and is caused to pierce the center spot and to secure the same to the cushion liner.

The staples are preformed from the strip 165 by the forming punch 230 and die 231 which form the staple points, the plungers 238 which bend the points downwardly and the plunger 245 which cuts the staples from the strip. The cut staples are then fed along the block 250 by the feeding movement of the strip so that a formed staple is always in position to be driven by the stapling plunger 261.

In order to prevent a stop from being stamped out of the strip 116 when no cap is in position to receive the same, a latch mechanism is provided which comprises the finger 320, which, when in a lowered position as shown in Fig. 3 locks the arm 322 to the lever 332 so that the arm 322 is actuated by the subsequent elevation of the head 127. The actuation of the arm 322 causes the arm 345 to shift the balls 288 out of locking position and to release the one-way clutch mechanism 282 thereby interrupting the feed of the spot strip 116.

The latch 180 is also actuated at the same time to interrupt the feed of the stapling strip 165. The stapling plunger 261 and the spot plunger 124 are accordingly permitted to continue in operation without applying further spots or staples until a cap is again brought into position to receive the same. When this occurs the finger 320 is elevated, thereby releasing the arm 322 and reengaging the latch 180 so as to permit the feed mechanism to resume operation. This operation also releases the one-way ball clutch 282 and permits the spot strip feed mechanism to resume operation.

It will be noted that in the above-described apparatus the spot of metal foil or the like is applied to the cushion liner by mechanical means. Consequently it is permanently held in position so that the caps may be stored for long periods of time if desired without danger of the spots loosening or coming off. Any holes which may be formed in the spots by the staples are effectively sealed by the filler material which is applied by the transfer plungers 31. The filler material may have some adhesive effect for assisting in holding the edges of the spot against the liner. In the usual operation, however, using spots of aluminum foil or the like having a thickness of about .002", the spots possess sufficient rigidity and stiffness to retain their position on the liner and to prevent the edges from turning up.

It is to be noted in this connection that the spot is of such dimension that it is practically impossible for the edges of another cap to come in contact with the edge of the spot even when a quantity of caps are tumbled in a hopper. Consequently the edges of the spots are protected against mechanical disturbance which would tend to bend or flex them.

The staples of course are made of a material which does not deleteriously affect the contents of the bottle to be capped, and are preferably made of the same material as the spot itself. In the above example the staples may be made from an aluminum strip material so that a complete aluminum surface is presented to the contents of the bottle. The bent-under points of the staples securely hold the same in the cushion liner and prevent the staples or the spots from becoming loosened in use. This stapling action also results in constant pressure being exerted between the spot and the cushion liner so as to maintain a pressure contact which prevents leakage of liquids under the spot.

The above-described machine may be operated at comparatively high speeds and provides a cheap, efficient and commercially practicable means for applying spots to crown caps. In certain instances it is unnecessary to apply the filler material to the liner before the spot is affixed, in which event the transfer wheel 30 and associated apparatus may be omitted. It has been found, however, that this filler material, at least over the area occupied by the staple, improves the characteristics of the finished cap.

The spot 115 may cover the entire cushion liner 12 or may be located only at the center, leaving the liner exposed at the points of contact with the bottle rim in accordance with standard practice where center spots are required.

It will be noted that the spot is held down under pressure while the staple is being applied, thereby preventing wrinkles or dishing. The staple also holds the spot in pressure engagement with the liner, a feature which cannot be obtained by use of adhesives alone for securing the spot.

It is to be understood that other mechanical securing means such as rivets, tacks or the like may be used in place of the staples shown herein without departing from the broader aspects of the invention. Furthermore the staples may be preformed and fed from a hopper or from a stack or strip of formed staples if desired.

Although a specific embodiment of the invention has been shown for purposes of illustration it is to be understood that the invention is capable of various uses and that changes and modifications may be made therein as will be readily apparent to a person skilled in the art. The invention is only to be limited in accordance with the scope of the appended claims.

The invention claimed is:

1. A machine for applying spots to caps of the crown type having a shell and a cushion liner, comprising means for feeding said caps past a spot applying station, means at said station to supply and position said spots on the cushion liners of said caps, means for holding said spots in position thereon, and means at said station operable subsequent to the operation of said holding means for inserting a mechanical securing means through said spot and cushion liner to secure said spots to said liners while the spot is so held in position.

2. A machine for applying spots to caps of the crown type having a shell and a cushion liner, comprising means for feeding said caps to a spot applying station, means to feed a strip of spot material to said station, means to punch a spot from said strip at said station, means at said station synchronized with said feed means to insert said spot on the cushion liner of a cap, means at said station for inserting a mechanical securing means through said spot and said cushion liner for permanently securing said spot thereto, and mechanism operatively connected to said spot inserting means and said securing means inserting means to operate said two means successively.

3. A machine for applying spots to caps of the crown type having a shell and a cushion liner, comprising means for feeding said caps to a spot applying station, means for feeding a strip of spot material to said station, die means to punch out a spot from said material and to apply the same to the cushion liner of a cap, said die means having means for holding said spot in position on said liner, and means for inserting a mechanical securing means through said spot and said cushion liner while said spot is so held in position by said holding means.

4. A machine for applying spots to caps of the crown type having a shell and a cushion liner, comprising means for feeding said caps to a spot applying station, means for applying a spot to said cushion liner at said station, stapling means for inserting a staple through said spot and said liner for permanently securing said spot in position, and mechanism operatively connected to said applying and stapling means to operate such means successively.

5. A machine for applying spots to caps of the crown type having a shell and a cushion liner, comprising means for feeding said caps to a spot applying station, means at said station for applying a spot to said cushion liner, stapling means comprising a stapling plunger, feed means supplying staples to the path of said plunger, means actuating said plunger for driving said staples through said spot and said cushion liner, means engaging the back of the cap shell and cooperating with said stapling plunger to bend the ends of the staple over to thereby securely lock the spot in position and to maintain said spot in pressure contact with said cushion liner, and mechanism operatively connected to said applying and stapling means to operate such means successively.

6. A machine for applying spots to caps of the crown type having a shell and a cushion liner, comprising means for feeding said caps to a spot applying station, means for feeding a strip of spot material to said station, die means at said station for stamping out a spot from said strip and applying same to said cushion liner, stapling means at said station adapted to drive staples through said spot and said cushion liner for permanently securing said spot in place, and mechanism operatively connected to said applying and stapling means to operate such means successively.

7. A machine for applying spots to caps of the crown type having a shell and a cushion liner, comprising means for feeding said caps to a spot applying station, means for feeding a strip of spot material to said station, die means at said station for stamping out a spot from said strip and applying same to said cushion liner, stapling means at said station comprising a stapling plunger, means for feeding staples to the path of said plunger, and means actuating said plunger to drive said staple through said spot and said liner, and mechanism operatively connected to said applying and stapling means to operate such means successively.

8. A machine for applying spots to caps of the crown type having a shell and a cushion liner, comprising means for feeding a row of caps to a plurality of operating stations of said machine, means at one of said stations to apply a film of filler material to said cushion liner, means at another of said stations to apply a spot to said cushion liner over said filler material, and means to insert a mechanical securing means through said spot and said cushion liner for permanently securing said spot in place.

9. A machine for applying spots to caps of the crown type having a shell and a cushion liner, comprising means for feeding a row of caps to a plurality of operating stations of said machine, means at one of said stations to apply a film of filler material to said cushion liner, means at another of said stations to apply a spot to said cushion liner over said filler material, and stapling means adapted to drive a staple through said spot, said film and said cushion liner for permanently securing said spot in place.

10. A machine for applying spots to caps of the crown type having a shell and a cushion liner, comprising means for feeding a row of caps to a plurality of operating stations of said machine, means at one of said stations to apply a film of filler material to said cushion liner, means at another of said stations to apply a spot to said cushion liner over said filler material, means for holding said spot in position on said cushion liner, and means for driving a mechanical securing means through said spot, said film and said liner while said spot is so held in position.

11. A machine for applying spots to caps of the crown type having a shell and a cushion liner, comprising means for feeding a row of caps to a plurality of operating stations of said machine, means at one of said stations to apply a film of filler material to said cushion liner, means at another of said stations to apply a spot to said cushion liner over said filler material, means for holding said spot in position on said cushion liner, and stapling means for inserting a staple through said center spot, said film and said cushion liner while said spot is so held in position.

12. A machine for applying spots to caps of the crown type having a shell and a cushion liner, comprising a pair of guide rails forming a track on which said caps are supported for feeding movement through said machine, feed means comprising a reciprocating member having fingers adapted to be inserted between successive caps for spacing and progressively feeding the same, a filler applying means comprising a reservoir for liquid filler material, a roller rotating in said reservoir for picking up a surface film of said material, transfer means transferring said film to said cushion liners as the caps are progressively advanced by said feed means, means for positioning a spot on said cushion liner over said filler material, and means operable on a cap held by said reciprocating member for inserting a mechanical securing means through said spot, said film and said cushion liner for permanently securing said spot in place.

13. A machine for applying spots to caps of the crown type having a shell and a cushion liner, comprising a pair of guide rails forming a track on which said caps are supported for feeding movement through said machine, feed means comprising a reciprocating member having fingers adapted to be inserted between successive caps for spacing and progressively feeding the same, a filler applying means comprising a reservoir for liquid filler material, a roller rotating in said reservoir for picking up a surface film of said material, a transfer wheel having a plurality of transfer plungers adapted to successively wipe the surface of said roller for picking up a coating of said material, means actuating said transfer wheel in synchronism with the feed of said caps, said last means causing successive plungers to contact the cushion liners of successive caps for transferring said filler material thereto, means for applying a spot to said cushion liner over said filler material, and means operable on a cap held by said reciprocating member for inserting a mechanical securing means through said spot and through said cushion liner for permanently securing said spot in position.

14. A machine for applying spots to caps of the crown type having a shell and a cushion liner, comprising a pair of guide rails forming a track on which said caps are supported for feeding movement through said machine, feed means comprising a reciprocating member having fingers adapted to be inserted between successive caps for spacing and progressively feeding the same, a filler applying means comprising a reservoir for liquid filler material, a roller rotating in said reservoir for picking up a surface film of said material, a transfer wheel having a plurality of transfer plungers adapted to successively wipe the surface of said roller for picking up a coating of said material thereon, means actuating said transfer wheel in synchronism with the feed of said caps, said last means causing successive plungers to contact the cushion liners of successive caps for transferring said filler material thereto, means for feeding a strip of spot material to a spot applying station, die means for punching a spot from said strip, said die means being adapted to insert said spot on said cushion liner over said filler material, and means operable on a cap held by said reciprocating member at said station for inserting a mechanical securing means through said spot and said cushion liner for permanently securing said spot in position.

15. A machine for applying spots to caps of the crown type having a shell and a cushion liner, comprising a pair of guide rails forming a track on which said caps are supported for feeding movement through said machine, feed means comprising a reciprocating member having fingers adapted to be inserted between successive caps for spacing and progressively feeding the same, a filler applying means comprising a reservoir for liquid filler material, a roller rotating in said reservoir for picking up a surface film of said material, a transfer wheel having a plurality of transfer plungers adapted to successively wipe the surface of said roller for picking up a coating of said material, means actuating said transfer wheel in synchronism with the feed of said caps, said last means causing successive plungers to contact the liners of successive caps for transferring said filler material thereto, means for feeding a strip of spot material to a spot applying station, die means for punching a spot from said strip, said die means being adapted to insert said spot on said cushion liner over said filler material, means for holding said spot in position on said liner, and means operable on a cap held by said reciprocating member for driving a mechanical securing means through said spot and through said cushion liner while said spot is held in position by said holding means.

16. In a machine for applying spots to caps of the crown type having a shell and a cushion liner, a die adapted to cooperate with a strip of spot material, said die comprising an outer annular die member and an inner plunger, means for positioning said outer die member in contact with said cushion liner, means for actuating said plunger for stamping out a spot from said strip material and positioning the same on said liner within said outer annular die member, a longitudinal channel in said plunger providing a guide channel for a staple, means for feeding a staple thereto, and a stapling plunger operating in said channel to drive said staple through said spot and through said cushion liner while said first plunger holds said spot in place.

17. In a machine for applying spots to caps of the crown type having a shell and a cushion liner, a die having means for stamping out a spot from a strip of spot material and for inserting the same on said cushion liner, a stapling plunger associated with said die to drive a staple through said spot and through said cushion liner, a staple forming mechanism adapted to form said staples, means for feeding a strip for staple material to said staple forming mechanism, and means for feeding the formed staples from said staple forming mechanism to said stapling plunger.

18. In a machine for applying spots to caps of the crown type having a shell and a cushion liner, means for inserting a spot on said liner, a stapling plunger adapted to drive a staple through said spot and said liner, staple forming means for forming staples from a strip of staple material comprising cutting members adapted to cut staple points, a forming member adapted to bend said points downwardly, a second cutting member adapted to cut apart the individual staples, and means for feeding said staples to a position to be driven by said stapling plunger.

19. In a machine for applying spots to caps of the crown type having a shell and cushion liner, means for feeding a strip of spot material, means for feeding a strip of staple material, die means to punch a spot from said spot material and to position the same on said cushion liner, cutting means to cut staples from said staple material, and stapling means to drive said staples through said spot and through said cushion liner.

20. In a machine for applying spots to caps of the crown type having a shell and a cushion liner, means for feeding a strip of spot material, means for feeding a strip of staple material, die means to punch a spot from said spot material and to position the same on said cushion liner, cutting means to cut staples from said staple material, stapling means to drive said staples through said spot and through said cushion liner, and means for interrupting the feeding of both of said strips except when a cap is in position to receive a spot.

21. In a machine for applying spots to caps of the crown type having a shell and a cushion liner, means for forming said spots, means for inserting the same on said cushion liner, stapling means to drive the staple through said spot and through said cushion liner, staple forming means, means for feeding a strip of staple material to said staple forming means, said feeding means comprising upper and lower blocks, drive means causing said blocks to reciprocate in alternate feed and return strokes, means causing said blocks to clamp said strip material during said feed strokes, and means causing said blocks to release said strip material during said return strokes.

22. In a machine for applying spots to caps of the crown type having a shell and a cushion liner, means for forming said spots, means for inserting the same on said cushion liner, stapling means to drive the staple through said spot and through said cushion liner, staple forming means, means for feeding a strip of staple material to said staple forming means, said feeding means comprising upper and lower blocks, means causing said blocks to reciprocate in alternate feed and return strokes, means causing said blocks to clamp said strip material during said feed strokes, means causing said blocks to release said strip material during said return stroke, and means for clamping said material during said return stroke to thereby prevent reverse feeding thereof.

23. In a machine for applying spots to caps of the crown type having a shell and a cushion liner, means for forming said spots, means for inserting the same on said cushion liner, stapling means to drive the staple through said spot and through said cushion liner, staple forming means, means for feeding a strip of staple material to said staple forming means, said feeding means comprising upper and lower blocks, drive means causing said blocks to reciprocate in alternate feed and return strokes, means causing said blocks to clamp said strip material during said feed strokes, means causing said blocks to release said strip material during said return strokes, and cap actuated means operable in the absence of a cap in spot receiving position to interrupt the feed movement of said blocks.

24. In a machine for applying spots to caps of the crown type having a shell and a cushion liner, means for forming said spots, means for inserting the same on said cushion liner, stapling means to drive the staple through said spot and through said cushion liner, staple forming means, means for feeding a strip of staple material to said staple forming means, said feeding means comprising upper and lower blocks, drive means causing said blocks to reciprocate in alternate feed and return strokes, means causing said blocks to clamp said strip material during said feed strokes, means causing said blocks to release said strip material during said return strokes, a reciprocating drive means, latch means connecting said drive means to said first drive means to impart feed movement to said blocks, and cap actuated means operable in the absence of a cap in spot receiving position to release said latch means so as to interrupt the feed movement of said blocks.

25. In a machine for applying spots to caps of the crown type having a shell and a cushion liner, means for forming said spots, means for inserting the same on said cushion liner, stapling means to drive the staple through said spot and through said cushion liner, staple forming means, means for feeding a strip of staple material to said staple forming means, said feeding means comprising upper and lower blocks, drive means causing said blocks to reciprocate in alternate feed and return strokes, means causing said blocks to clamp said strip material during said feed strokes, means causing said blocks to release said strip material during said return strokes, a reciprocating drive means, latch means connecting said drive means to said first drive means to impart feed movement to said blocks, and cap actuated means operable in the absence of a cap in spot receiving position to release said latch means so as to interrupt the feed movement of said blocks, said cap actuated means comprising a finger adapted to engage and be elevated by a cap in spot receiving position.

26. In a machine for applying spots to a cap of the crown cap having a shell and a cushion liner, means for inserting a spot on said liner, a stapling plunger to drive a staple through said spot completely and through said cushion liner, a staple forming mechanism adapted to form said staples, means for feeding a strip of staple material to said staple forming mechanism, and means for feeding the formed staples from said staple forming mechanism to said stapling plunger.

27. A machine for applying spots to caps of the crown type having a shell and a cushion liner, comprising means for feeding said caps to a spot applying station, means at said station to supply and insert a spot on the cushion liner of a cap, means at said station for inserting a mechanical securing means through said spot and said cushion liner for permanently securing said spot thereto, and mechanism operatively connected to said spot inserting means and said securing means inserting means to operate said two means successively.

28. A machine for applying spots to caps of the crown type having a shell and a cushion liner, comprising means for feeding said caps to a spot applying station, means at said station for applying a spot to said cushion liner, stapling means comprising a stapling plunger, feed means supplying staples having legs of a length greater than the combined thickness of the cushion liner and spot to the path of said plunger, means actuating said plunger for driving said staples through said spot and said cushion liner, means engaging the back of the cap shell and cooperating with said stapling plunger to bend the ends of the legs of the staple over by engagement with the cap shell to thereby securely lock the spot in position and to maintain said spot in pressure contact with said cushion liner, and mechanism operatively connected to said applying and stapling means to operate such means successively.

CLARENCE S. JACKSON.
ALEXANDER C. PARLINI.
EUGENE HASCHER.